(12) United States Patent
Struble et al.

(10) Patent No.: US 6,433,685 B1
(45) Date of Patent: Aug. 13, 2002

(54) SYSTEM AND METHOD FOR LOCATING LOST OR STOLEN ARTICLES

(75) Inventors: Christian L. Struble; Robert Sesek, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/797,785

(22) Filed: Mar. 2, 2001

(51) Int. Cl.[7] .............................................. G08B 13/14
(52) U.S. Cl. ....................... 340/571; 340/426; 342/457
(58) Field of Search ................................. 340/571, 539, 340/425.5, 426, 505; 342/457

(56) References Cited

U.S. PATENT DOCUMENTS

| | | | | |
|---|---|---|---|---|
| 4,908,629 A | * | 3/1990 | Apsell et al. ................ | 342/457 |
| 5,055,851 A | * | 10/1991 | Sheffer ........................ | 342/457 |
| 5,276,435 A | * | 1/1994 | Rossides .................... | 340/691.6 |
| 5,557,254 A | * | 9/1996 | Johnson et al. .............. | 340/426 |
| 5,631,642 A | * | 5/1997 | Brockelsby et al. ........ | 340/993 |
| 5,969,433 A | * | 10/1999 | Maggiora et al. ........... | 307/10.5 |
| 6,069,588 A | * | 5/2000 | O'Neill, Jr. ................. | 343/713 |
| 6,087,937 A | * | 7/2000 | McCarthy ................... | 340/567 |
| 6,157,317 A | * | 12/2000 | Walker .................. | 340/825.44 |

* cited by examiner

*Primary Examiner*—John Tweel (57) ABSTRACT

A system and method are provided for facilitating the locating of lost or stolen articles. The method includes providing an article registry comprising one or more registered article identification information and associated owner preference information. The method also includes providing a lost article registry comprising one or more lost article identification information. The method further includes receiving a first article identification; and responsive to finding the first article identification in the lost article registry, transmitting the associated owner preference information. The system includes a security server which includes an article registry comprising one or more registered article identification information and associated owner preference information. The security server also includes a lost article registry comprising one or more lost article identification information. The security server further includes a module coupled to the article registry and the lost article registry and operable to receive an article identification information. The module is also operable to determine if the received article information is in the lost article registry and, to retrieve and transmit the owner preference information associated with the received article information in response to finding the received article identification information in the lost article registry.

20 Claims, 7 Drawing Sheets

SYSTEM AND METHOD FOR LOCATING LOST OR STOLEN ARTICLES

BACKGROUND

1. Field

The present invention relates generally to monitoring systems, and in particular, to a system and method for locating lost or stolen articles.

2. Description of the Related Art

Various systems and devices have been used to deter theft of articles, and in the event of theft or loss, to enable the recovery of those lost or stolen articles. Article monitoring systems are available that utilize a sensor that is attached to the article. For example, in clothing stores, the sensors are attached to articles of clothing. When the article is moved past a detecting device, an alarm is triggered. These sensors are generally used to deter shoplifting of the articles in stores. However, the sensors are unsuitable for assisting in the recovery of lost or stolen articles. If the sensor is successfully removed from the article or moved past or around the detecting device and subsequently removed from the article, the article is no longer detectable.

Vehicle anti-theft systems and devices have been developed to deter the theft of automobiles. These systems typically include a remote control device, one or more sensors, and an alarm mounted in a vehicle. The sensors are used to monitor the status of openings (e.g., doors and windows) and movement in or near the vehicle. The remote control device is used to arm or disarm the alarm. The alarm, when triggered, makes an audible noise and may flash the vehicle's lights. The vehicle anti-theft systems are used to deter vehicle theft. However, the vehicle anti-theft systems are unsuitable for assisting in the recovery of vehicles once the vehicle is stolen. A stolen vehicle is typically indistinguishable from other, non-stolen vehicles.

Identification information affixed to an article provides a mechanism for recovering the article in case of loss or theft. For example, many articles, such as electronic devices, automobiles, bicycles, and watches, have a unique serial number that identifies each article. The serial number is typically printed on a sticker and affixed to the article or is directly engraved on the article. If the article is stolen or lost, the serial number can be used to identify the rightful owner of the article. However, it is difficult to detect stolen or lost articles because the serial numbers are typically small and inconspicuous. Furthermore, a thief in possession of a stolen article can easily remove the serial number from the article.

In another example, owners have been known to place identification marks on their articles for identification purposes. The identification marks are typically made in inconspicuous locations on the article. These identification marks are only useful as long as the marks have not been tampered with and the article is recovered. However, these marks, because they are inconspicuous, are unsuitable for assisting in the recovery of the article. Furthermore, a thief in possession of the article can easily remove or obscure the identification mark once it is found.

There exists a need to not only deter the theft of articles, but also enable the recovery of lost or stolen articles. Current methods of deterring theft are unsuitable for enabling the recovery of the article once stolen, and current methods of identifying articles once stolen or lost are too easy to compromise. What is needed is a method for locating lost or stolen articles that is not susceptible to being compromised.

SUMMARY

The present invention provides a system and method for locating lost or stolen articles. A security server maintains a lost article registry comprising identification information that identifies lost or stolen articles. The security server also maintains owner preference information that identifies one or more actions to perform if a reported lost or stolen article is located. The security server is coupled to detectors which are located at various locations, such as, by way of example, shopping malls, merchant establishments, gas stations, airports, toll booths, etc. The detectors transmit a request for article identification to the articles that are within range of receiving the transmission.

The articles are each equipped with a short-range transceiver and a unique identification. An owner of an article equipped with such a transceiver may register the article with the security server and, if lost or stolen, may report the article as lost or stolen. The transceiver in the article receives the request for identification transmitted by a detector that is within range and transmits the article identification information to the requesting detector. The detector then communicates with the security server to determine if the particular article has been reported lost or stolen by its owner. If the article was reported lost or stolen, the detector may transmit to the article a command that causes an action to be initiated on the article, such as, by way of example, disabling the article, triggering an alarm on the article, displaying a message on the article, etc. Additionally, location information for the article may be transmitted back to the security server based on the location of the detector detecting the article.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for reporting article identification information includes: providing, on an article, communication capability to a detector; transmitting article identification information to the detector; receiving owner preference information from the detector; and responsive to receiving owner preference information, initiating an action on the article.

In another embodiment, a method for providing an article security service includes: providing an article registry comprising one or more registered article identification information and associated owner preference information; providing a lost article registry comprising one or more lost article identification information; receiving a first article identification; and responsive to finding the first article identification in the lost article registry, transmitting the associated owner preference information.

In still another embodiment, a security server includes an article registry comprising one or more registered article identification information and associated owner preference information. The security server also includes a lost article registry comprising one or more lost article identification information. The security server further includes a module coupled to the article registry and the lost article registry and operable to receive an article identification information. The module is also operable to determine if the received article information is in the lost article registry and, to retrieve and transmit the owner preference information associated with the received article information in response to finding the received article identification information in the lost article registry.

In yet another embodiment, a security apparatus coupled to an article includes an article identification information operable to uniquely identify the article. The security apparatus also includes a detector communication module coupled to the article identification information and operable to receive a request to transmit the article identification information. The detector communication module is also operable to receive owner preference information, and to trigger an action on the article based on the received owner preference information.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

A security system and corresponding methods, according to an embodiment of the present invention, facilitates the locating of lost or stolen articles. Articles, such as, by way of example, automobiles, laptop computers, cell phones, cameras, camcorders, other portable electronic devices, etc., are equipped with a communication component that is capable of communicating with a detector over a limited distance. In particular, the communication component is capable of receiving a request from a detector to transmit information identifying the particular article, and transmitting a unique article identification information to the requesting detector. The communication component can be integrated into the article in a manner as to prevent the component being compromised or removed without disabling the article.

In one embodiment, an owner of such an article (e.g., an article equipped with the communication component) registers the article with a security server. If the article is then lost or stolen, the owner informs the security server that the article is lost or stolen. The owner may be required to provide a password or other identification metric to authenticate that it is the real owner that is reporting the article lost or stolen. The owner may also specify his or her preference of actions to be initiated in the instance the article is located. For example, the owner may specify his or her preference to have the article disabled, to set off an alarm on the article, to trigger a tracking device on the article, to display a message on the article, etc.

A provider of the article locating service may administer or operate the security server. The security server maintains a lost article registry that contains a list of articles that have been reported as lost or stolen. The security server is coupled to a network of detectors either directly or through one or more detector servers. Each detector is equipped with short-range communication device that is capable of connecting to any article which is equipped with a compatible communication component and which comes within range. The detector "detects" the article that is within its transmitting range. The detector receives the identification information from the article and transmits the identification information to the security server for determining if the identification information identifies an article that has been reported lost or stolen. The security server checks to see if the identification information is associated with an article that has been reported lost or stolen.

In one embodiment, the detector transmits the identification information directly to the security server using, for example, a wireless network. In another embodiment, one or more detectors communicate with the security server through a detector server. For example, the detectors located in a proximate area, such as, for example, a shopping center, an airport, a gas station, a building, a retail establishment, and the like, may be coupled to the security server through a network connection. The detectors then transmit the identification information to the detector server.

In one embodiment, the detector server can transmit the received identification information to the security server for verification that it is not associated with a lost or stolen article. If the identification information identifies an article that has been reported lost or stolen (e.g., the identification information is found in the lost article registry), the security server transmits the associated owner preference information to, for example, the detector server or the detector. The detector server can then transmit the received owner preference information to the detector that transmitted the identification information or the detectors that are within a proximate area of the detector that transmitted the identification information. In another embodiment, the detector server may download and maintain a local copy of the lost article registry and perform the check to determine if the identification information is found in the lost article registry.

If the identification information is associated with a lost or stolen article, the detector, as well as the other detectors that received the owner preference information, transmit the owner preference information to the article. If the article is within range of the transmission, the communication component in the article receives the owner preference information and initiates the appropriate action based upon the received owner preference information.

In one embodiment, the security server or detector server contains program logic to identify the detectors that are within a proximate area of the detector that detected the article. This enables the security server or detector server to transmit owner preference information to not only the detector that detected the article, but to the other detectors in the proximate area, thus, increasing the probability that the article receives the transmitted owner preference information.

Embodiments of the present invention are understood by referring to FIGS. 1–7 of the drawings. Throughout the drawings, components that correspond to components shown in previous figures are indicated using the same reference numbers.

Nomenclature

The detailed description that follows is presented largely in terms of processes and symbolic representations of operations performed by conventional computers. A computer may be any microprocessor or processor (hereinafter referred to as processor) controlled device, including terminal devices, such as personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, display, printer, or a speaker. Additionally, the computer includes memory such as a memory storage device or an addressable storage medium.

The computer may be a uniprocessor or multiprocessor machine. Additionally, the computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Overview

Figure 1:
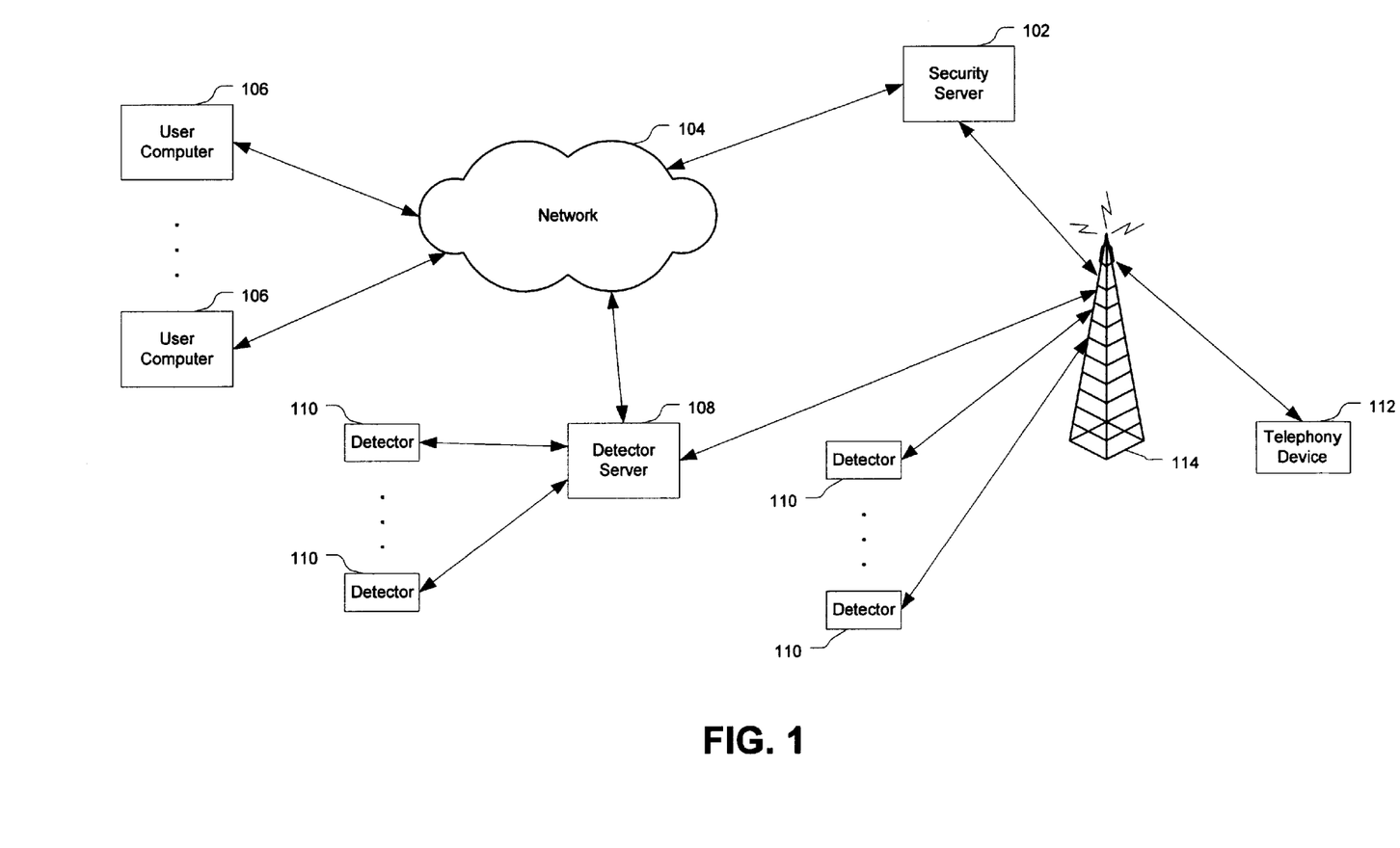
FIG. 1 illustrates an exemplary environment in which a security server, according to an embodiment of the present invention, may operate.

Referring now to the drawings, FIG. I illustrates an exemplary environment in which a security server 102, according to an embodiment of the present invention, may operate. This environment includes the security server 102 connected to a data network (e.g., the Internet) 104, a detector server 108, and a communication (e.g., telecommunication) network 114. The security server 102 and the detector server 108 may be coupled through the Internet 104 and/or the telecommunication network 114, or a combination of both. As used herein, the terms "connected," "coupled," or any variant thereof, means any connection or coupling, either direct or indirect, between two or more elements; the coupling or connection between the elements can be physical, logical, or a combination thereof.

Also as used herein, the terms "security server" and "detector server" are to be viewed as designations of one or more computers and are not to be otherwise limiting in any manner. The computers for the security server and the detector server may be the same or different. The security server 102 may, for example, be comprised of one or more modules that execute on one or more computers. Furthermore, the security server 102 and the detector server 108 need not be server based, but can comprise one or more modules that execute on one or more computers.

Referring again to FIG. 1, the environment also includes one or more user computers 106 coupled to the Internet 104, one or more detectors 110 coupled to the detector server 108, and one or more detectors 110 coupled to the security server 102 through the telecommunication network 114. The environment also includes a telephony device 112 coupled to the security server 102 through the telecommunication network 114.

The security server 102 facilitates the locating of one or more articles reported lost or stolen by its owner. In particular, the security server 102 contains program logic to facilitate communication with one or more detectors 110 and detector servers 108 to receive article identification information. The security server 102 provides a database containing a list of articles reported lost or stolen by their owners. The security server 102 also contains program logic to determine if the received article identification information is found in the database of lost or stolen articles. If the article identification information identifies a lost or stolen article, the security server 102 informs the reporting detector 110 or detector server 108 that the article has been reported lost or stolen by its owner.

In another embodiment, the security server 102 maintains a location map that identifies the location of the detectors 110 and/or detector servers 108. The security server 102 contains program logic that uses, for example, the location of a detector 110 that detected an article to identify one or more detectors 110 that are proximately located from the detector 110 that detected the article. For example, the security server 102 may receive an article identification information from a particular detector 110 and identify that the article identification information identifies a reported lost or stolen article. The security server 102 can then use the location map to identify one or more other detectors 110 that are proximately located to the reporting detector 110 and transmit the owner preference information to the reporting detector 110 and the other proximately located detectors 110.

In one embodiment, the security server 102 supports or provides a web site that is accessible by users and, in particular, article owners. An article owner may use his or her user computer 106 to access the security server 102 web site and register for the security services. For example, an article owner executes a client application, such as a browser, on his or her user computer 106 to access the security server 102 through the Internet 104. The browser is a software program that allows the owner to access different computers, including the security server 102, connected to the Internet 104. In one embodiment, the browser may be a standard browser such as the Netscape Navigator® developed by Netscape, Inc., the Microsoft Internet Explorer® developed by Microsoft Corporation, a WebTV, an embedded web browser on a handheld device, or the like. In another embodiment, other types of access software, such as, by way of example, other types of Internet browsers, custom network browsers, communication software, cable modem software, point-to-point software, multi-point software, custom emulation software, and the like, could be used to implement the browser.

The web site may support or maintain one or more web pages through which the article owner provides, for example, identification and contact information. The web site may then create a user account for the registered article owner, and provide the article owner account information that is needed to access his or her user account. Subsequently, the article owner can access the web site, provide his or her user account information, and register one or more articles with the security server 102. For example, the web site may support or maintain a web page through which the owner can register an article by providing article identification information that uniquely identifies the article, and his or her preference information (e.g., owner preference information) which specifies what he or she wants done in case the article is lost or stolen and subsequently located. The web site may also support or maintain a web page through which a registered owner can report one or more lost or stolen articles. In one embodiment, this web page is protected and requires authentication information, such as, by way of example, a user login and password, to gain access to report one or more articles as lost or stolen. In another embodiment, the web site may be password-protected, thus requiring a valid user login and password to gain access to the web site.

In another embodiment, the security server 102 supports a telecommunication interface that generally functions to provide connectivity between the security server 102 and the telecommunication network 114. The telecommunication interface provides the article owners access to the security server 102 over the telecommunication network 114. For example, an article owner can use his or her telephony device 112 to call into the security server 102 and access the features and services of the security server 102 using the telephony device 112. Examples of telephony devices 112 include a cellular phone, a wireless phone, a telephone, a web phone, a personal digital assistant (PDA), and the like.

The telecommunication network 114 may include networks capable of transporting voice communications. Examples of such networks include a telephone network, a wireless network, cellular networks, a satellite network, the Internet 104, and the like. The telecommunication interface of the security server 102 generally functions to provide article owners with a voice interface to the security server 102. For example, the telecommunication interface may provide a sequence of voice prompts through which an article owner can register one or more articles with the security server 102, as well as report one or more lost or stolen articles.

The Internet 104 is a global network connecting millions of computers, including the security server 102. The structure of the Internet 104, which is well known to those of ordinary skill in the art, is a global network of computer networks and utilizes a simple, standard common addressing system and communications protocol known as Transmission Control Protocol/Internet Protocol (TCP/IP). The connections between different networks are called "gateways," and the gateways serve to transfer electronic data worldwide.

One part of the Internet 104 is the World Wide Web (WWW or Web). The Web is generally used to refer to both (1) a distributed collection of inter-linked, user-viewable hypertext documents (commonly referred to as "web documents" or "web pages" or "electronic pages" or "home pages") that are accessible via the Internet 104, and (2) the client and server components which provide user access to such documents using standardized Internet 104 protocols. The web documents are encoded using Hypertext Markup Language (HTML) and the primary standard protocol for allowing the components to locate and acquire web documents is the Hypertext Transfer Protocol (HTTP). However, as used herein, the term Web is intended to encompass future languages and protocols which may be used in place of, or in addition to, HTML and HTTP.

The Web contains different computers that store and serve web pages, such as HTML documents, capable of displaying textual and graphical information on a computer screen. These computers are generally referred to as "web sites." The security server 102 may include such a computer that supports a web site with respective web pages, thus providing information on the Web. A web site is accessed through a unique Internet address that corresponds to a web page within the web site. The web page may advantageously organize the presentation of text, graphical images, video, and audio, as well as provide links to other web pages in the web site or the Web. Furthermore, the web page may be implemented as a conduit for the dissemination of data and information from the web site as well as the receipt of data and information into the web site.

One of ordinary skill in the art will appreciate that the Internet 104 may advantageously be comprised of one or a combination of other types of networks without detracting from the scope of the invention. The Internet 104 can include, by way of example, local area networks (LANs), wide area networks (WANs), public internets, private intranets, a private computer network, a secure internet, a private network, a public network, a value-added network, interactive television networks, wireless data transmission networks, two-way cable networks, satellite networks, interactive kiosk networks, and/or any other suitable data network.

The detector server 108 facilitates the communication between one or more detectors 110 and the security server 102. The detector server 108 services one or more coupled detectors 110. For example, the detector server 108 may be located at a shopping mall and may be coupled to, and service the detectors 110 that are positioned at various locations inside or proximate to the shopping mall. The detector server 108 contains program logic to receive an article identification information from a coupled detector 110 and inform the detector 110 of the status of the article identified by the article identification information. For example, if the article identification information identifies a reported lost or stolen article, the detector server 108 may transmit the owner preference information associated with the article to the detector 110.

In one embodiment, the detector server 108 transmits the article identification information received from a detector 110 over the Internet 104 to the security server 102. The detector server 108 then receives an indication from the security server 102 if the article identified by the article identification information has been reported lost or stolen. The indication may include the owner preference information for the reported lost or stolen article. In another embodiment, the detector server 108 maintains a list of articles reported lost or stolen by their owners. The detector server 108 may periodically, for example, once every hour, connect to the security server 102 and download the list of reported lost or stolen articles and their associated owner preference information. The detector server 108 may receive updated information on lost or stolen articles from the security server 102 when there is a change to the list of articles reported lost or stolen since the information was last updated on the detector server 108. The detector server 108 may then determine if a received article identification information identifies an article that has been reported lost or stolen.

In one embodiment, the detector server 108 may contain program logic to determine one or more detectors 110 which are located within a proximate distance from a detector 110 that detected an article and transmitted an article identification information to the detector server 108. For example, for each detector 110 coupled to the detector server 108, the detector server 108 can maintain a list of one or more other detectors 110 that are within a predetermined proximate distance or area from the detector 110. The list of other detectors 110 may include all the detectors 110 that are coupled to the detector server 108. The detector server 108 can then transmit a notification that a particular article identification information identifies a reported lost or stolen article to not only the detector 110 that originally transmitted the article identification information to the detector server 108, but also to the other proximately located detectors 110.

In another embodiment, the detector server 108 may contain program logic to maintain history information that is used to determine one or more detectors 110 to notify in case an article identification information is reported that identifies a lost or stolen article. The history information may include an identification of the detectors 110 that detected an article and reported the article identification information to the detector server 108. The detector server 108 can then use this information to possibly determine a direction that a reported lost or stolen article is travelling, and identify one or more detectors 110 that are proximately located in the direction of travel. The detector server 108 can then transmit the owner preference information associated with this article to the identified detectors 110.

The detector 110 generally functions to detect articles that come within a short-range of its position. The detector 110 contains program logic and components to sense the presence of an article that comes within its range (e.g., a predetermined distance and direction from the detector 110). The detector 110 may be located within establishments, such as, by way of example, airports, shopping malls, stores, restaurants, bus stations, train stations, toll booths, gas stations, and other locations where a stolen or lost article may be taken. The detector 110 connects to a detected article and requests that the article transmit its article identification information. The detector 110 then transmits the article identification information to a coupled detector server 108 or the security server 102 using, for example, the telecommunication network 114. If the article identification information identifies a reported lost or stolen article, the detector 110 receives the owner preference information associated with the article and transmits the owner preference information.

Figure 2:
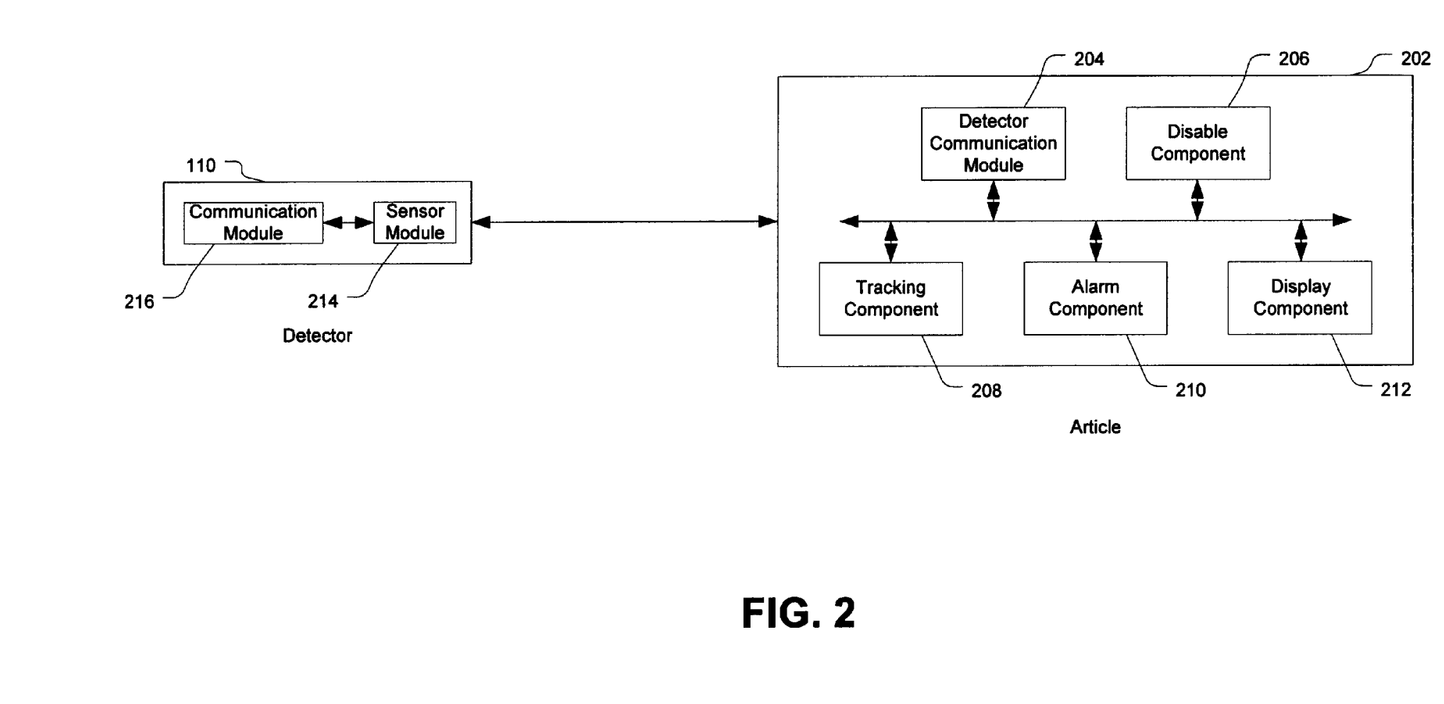
FIG. 2 illustrates exemplary components of an article and a detector, according to an embodiment of the present invention.

FIG. 2 illustrates exemplary components of an article 202 suitable for registration with the security server 102 and a detector 110, according to an embodiment of the present invention. As depicted, the article 202 includes a detector communication module 204, a disable component 206, a tracking component 208, an alarm component 210, and a display component 212. The detector 110 includes a sensor module 214 and a communication module 216. One of ordinary skill in the art will appreciate that the functionality provided by the components and modules of the article 202, the security server 102, the detector server 108, and the detector 110 may be combined into fewer components or modules or further separated into additional components and modules. Additionally, some of the components and modules may be optional and not provided. For example, the modules and components provided in an article 202 may depend on the nature of the article 202.

The detector communication module 204 facilitates the communication between the article 202 and the detector 110. The detector communication module 204 contains program logic to receive a request for the associated article identification information, and retrieves and transmits the article identification information associated with the article 202. The article identification information may be, by way of example, an article's 202 serial number, an article's 202 media access control (MAC) address, a vehicle identification number (VIN), or any other unique sequence of characters and symbols that uniquely identify an article 202. The detector communication module 204 also contains program logic to receive a notification that the article 202 has been reported lost or stolen. In particular, the detector communication module 204 receives the owner preference information associated with the lost or stolen article 202, and based on the owner preference information, initiates one or more actions on the article 202 using, for example, one or more of the components 206, 208, 210, and 212.

In one embodiment, the detector communication module 204 conforms to the Bluetooth protocol and specification (Bluetooth technology). Thus, the article 202 contains program logic and components that provide communication capability that conforms to the Bluetooth technology. As is appreciated by those of ordinary skill in the art, the Bluetooth technology specification provides interoperability guidelines to facilitate communication between computing devices that conform to the Bluetooth technology. Bluetooth technology specifies a short-range, wireless (e.g., radio) networking protocol for connecting various devices, such as, by way of example, automobiles, mobile phones, PDAs, laptop computers, desktop computers, etc. Furthermore, the Bluetooth specification defines power levels that facilitate communication between Bluetooth conformant devices over a limited distance. Bluetooth conformant devices automatically establish networks with other Bluetooth conformant devices that are within range. Thus, the Bluetooth conformant devices need to be near each other to communicate.

One of ordinary skill in the art will appreciate that the detector communication module 204 may be implemented to conform to, and support any number of wireless communication technologies, such as, by way of example, cellular communication technology, that provide communication between devices that conform to the particular wireless technology. Both the article 202 and the communicating device (e.g., detector 110) contain program logic and components that make the respective device conform to the wireless communication technology in order to enable interoperable communication between the devices.

The disable component 206 is connected to the detector communication module 204 and generally functions to disable operation of the article 202. The disable component 206 contains program logic to receive a command from, for example, the detector communication module 204 to disable the article 202. In response to receiving a disable command, the disable component 206 disables operation of the article 202, by for example, disabling the article 202 from powering up, turning off power to the article 202, requiring a secret code for the article 202 to power up, and the like. In the case of automobiles (e.g., the article 202 is an automobile or other motorized vehicle), the disable component 206 may include sensors which determine if the automobile is unoccupied and the transmission is not engaged, for example, at a gas station, and lock the automobile in addition to disabling the ignition. Disabled articles 202 may then be reported to and recovered by law enforcement agencies, which may notify and return the recovered articles 202 to their rightful owners.

The tracking component 208 is connected to the detector communication module 204 and generally functions to facilitate tracking of the article 202. The tracking component 208 contains program logic to receive a command from, for example, the detector communication module 204 to start emitting a tracking signal from the article 202. The tracking signal may then be used, for example, by a Global Positioning System (GPS) to track and identify the location of the article 202. In one embodiment, the location information may be sent to, for example, the security server 102 which forwards it to law enforcement authorities. The tracking signal aids the law enforcement authorities in their efforts to track and recover lost or stolen articles 202 by leading the law enforcement authorities to the located article 202. Once recovered, the law enforcement authority may notify the rightful owner that the article 202 has been recovered. The law enforcement authority may additionally return the recovered article 202 to its rightful owner. In another embodiment, the detectors 110 that may be located in fixed, known positions may facilitate the tracking of the lost or stolen article 202.

The alarm component 210 is connected to the detector communication module 204 and generally functions to trigger an audible and/or visible alarm on the article 202. The alarm component 210 contains program logic to receive a command from, for example, the detector communication module 204 to make an audible and/or visible alarm and the alarm component 210 triggers the alarm. In another embodiment, the alarm component 210 may trigger a silent alarm that is detected, for example, by law enforcement agencies in the area of the article's 202 location. In still another embodiment, for articles 202 such as automobiles that may have integrated telecommunication devices such as cellular phones, the alarm component 210 may initiate a phone call to a law enforcement agency and report, for example, its location and identity as a lost or stolen article 202. This may assist the law enforcement agency in recovering the lost or stolen article 202 and returning it to its rightful owner.

The display component 212 is connected to the detector communication module 204 and generally functions to display a message on the article's 202 display. The display component 212 contains program logic to receive a command from, for example, the detector communication module 204 to display a message on the article's 202 display. For example, the message may inform the viewer that the article 202 has been reported lost or stolen and that there is a reward offered for the return of the article 202 to its rightful owner or to a law enforcement agency. The message may include instructions on how to return the article 202 to its rightful owner and/or to a law enforcement agency. A person in possession of the lost or stolen article 202 may then return the article 202 to its rightful owner or the specified law enforcement agency, which may notify the rightful owner that the article 202 has been recovered. The message may be stored on an accessible memory device on the article 202 or be transmitted from, for example, the detector 110 that is within communication range with the article 202. In response to receiving a display message command, the display component 212 can cause the display of the message on the article's 202 display.

In one embodiment, a secret code is required to disable the aforementioned disabling, tracking, alarm, and display features. The owner of the article 202 may determine the secret code. For example, once an article 202 is disabled, the secret code needs to be input or provided in order for the article 202 to become operable. In the case of an alarm, once the alarm is sounded, the secret code needs to be input or provided to turn off the alarm. Similarly, the secret code needs to be input or provided to turn off the tracking signal or to stop the display of the message on the article 202. The secret code may be maintained on the security server 102 and made available to, for example, law enforcement authorities to disable a triggered feature on a recovered article 202.

The sensor module 214 of the detector 110 facilitates the detection of an article 202 and the communication between the detector 110 and the article 202. The sensor module 214 contains program logic to detect and connect to an article 202 that comes within, for example, transmitting or communicating range. For example, the sensor module 214 can detect the presence of articles 202 that come within the sensor module's 214 detecting or transmitting range. In one embodiment, the sensor module's 214 detecting range is substantially the same as its transmitting range. In particular, the sensor module 214 detects that an article 202 has come within its detecting range and transmits a request for the article's 202 article identification information. If the article identification information is associated with a lost or stolen article 202, the sensor module 214 transmits the respective owner preference information. The article 202 receives the owner preference information if it is still within the sensor module's 214 transmitting range.

In one embodiment, the sensor module 214 conforms to the Bluetooth technology, making the detector 110 a Bluetooth conformant device capable of communicating with other Bluetooth conformant devices. Here, the article 202 also conforms to and is compliant with the Bluetooth technology, making communication between the detector 110 and the article 202 possible. In another embodiment, the sensor module 214 may be implemented to conform to, and support any number of wireless communication technologies, such as, by way of example, cellular communication technology, that provide communication between devices that conform to the particular wireless technology. Both the detector 110 and the communicating device (e.g., article 202) contain program logic and components that make the respective device conform to the wireless communication technology in order to enable interoperable communication between the devices.

The communication module 216 of the detector 110 is connected to the sensor module 214 and generally functions to facilitate communication between the detector 110 and the detector server 108 or the security server 102. The communication module 216 contains program logic to receive an article identification information from the sensor module 214. The communication module 216 transmits the article identification information to a coupled detector server 108 or the security server 102. If the article identification information is associated with a lost or stolen article 202, the communication module 216 receives an owner preference information associated with the article 202 and transmits the owner preference information using, for example, the sensor module 214.

Figure 3:
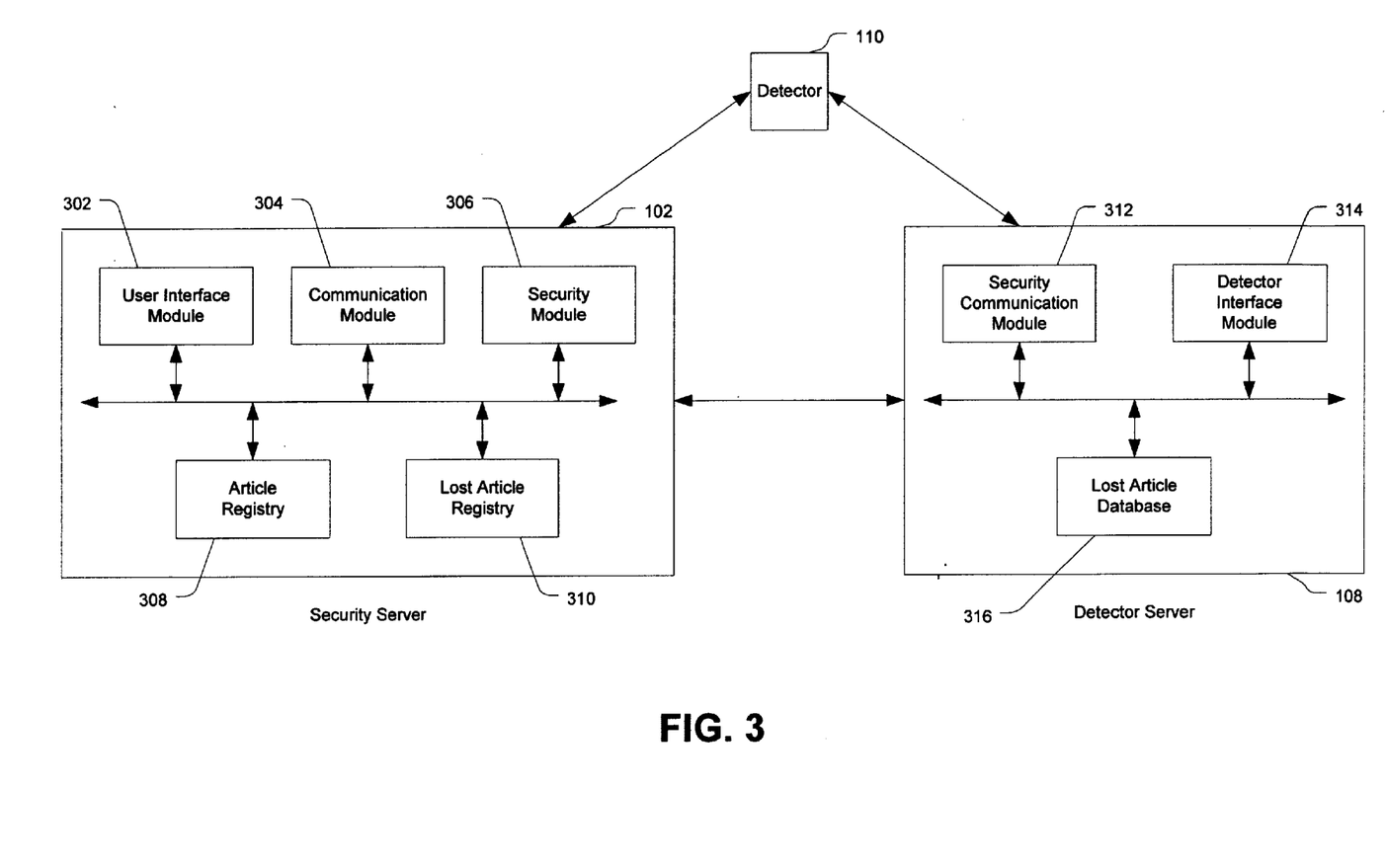
FIG. 3 illustrates exemplary components of a security server and a detector server, according to an embodiment of the present invention.

FIG. 3 illustrates exemplary components of the security server 102 and the detector server 108, according to an embodiment of the present invention. As depicted, the security server 102 includes a user interface module 302, a communication module 304, a security module 306, an article registry 308, and a lost article registry 310. The modules 302, 304, and 306, and the registries 308 and 310 are connected. The detector server 108 includes a security communication module 312 connected to a detector interface module 314 and a lost article database 316.

The user interface module 302 generally functions to provide users (e.g., article 202 owners) access to the security server 102 over the Internet 104. In one embodiment, the user interface module 302 provides one or more web pages through which an owner of an article 202 can register one or more articles 202 with the security server 102 as well as inform the security server 102 if one or more articles 202 are lost or stolen. In another embodiment, the user interface module 302 provides a series of voice prompts through which users can interact with the security server 102. The voice prompts may provide an interface through which the owner can register one or more articles 202 with the security server 102 as well as report one or more registered articles 202 as lost or stolen.

The communication module 304 generally functions to provide connectivity between the security server 102 and the Internet 104 and the telecommunication network 114. The communication module 304 contains program logic to facilitate communication over the Internet 104 between the security server 102 and the computers (e.g., the detector server 108) connected to the Internet 104. The communication module 304 can receive a request over the Internet 104 from a detector server 108 for, for example, the contents of the lost article registry 310 or determination whether an article identification information is associated with an article 202 that has been reported lost or stolen. The security server 102 can use the communication module 304 to transmit the requested information to the requesting detector server 108.

The communication module 304 may also facilitate communication over the telecommunication network 114 between the security server 102 and one or more detectors 110 capable of connecting to the telecommunication network 114. For example, the communication module 304 can receive a request over the telecommunication network 114 from a detector 110 for determination whether an article identification information is associated with an article 202 that has been reported lost or stolen. The security server 102 can use the communication module 304 to transmit the requested information to the requesting detector 110.

The security module 306 generally functions to determine if an article identification information identifies an article 202 that has been reported lost or stolen by its owner. The security module 306 contains program logic to receive an article identification information from, for example, the communication module 304. The security module 306 checks the contents of the lost article registry 310 to determine if the article identification information is associated with an article 202 in the lost article registry 310. If the article identification information is associated with a reported lost or stolen article 202, the security module 306 may determine one or more detectors 110 that are proximately located to the detector 110 that initially reported the article identification information, and transmit the owner preference information associated with the reported lost or stolen article 202 to the detectors 110. The security module 306 may utilize the communication module 304 to transmit the owner preference information to the detectors 110.

The article registry 308 generally functions to store data and information for the registered users (e.g., the registered article 202 owners having a user account on the security server 102) and the article identification information that respectively identifies each registered article 202. For example, one or more records containing user information, including article identification information and owner preference information for each registered article 202 may be maintained in the article registry 308. The lost article registry 310 generally functions to identify the registered articles 202, for example, from the article registry 308, that have been reported lost or stolen by their owners (e.g., the registered users). For example, one or more records containing an article identification information that identifies an article 202 reported lost or stolen may be maintained in the lost article registry 310. Thus, the lost article registry 310 can contain a list of reported lost or stolen articles 202.

The security communication module 312 of the detector server 108 generally functions to provide connectivity between the detector server 108 and the Internet 104. The security communication module 312 contains program logic to facilitate communication over the Internet 104 between the detector server 108 and the computers (e.g., the security server 102) connected to the Internet 104. The detector server 108 can utilize the security communication module 312 to connect to the security server 102 over the Internet 104 and, for example, request the contents of the lost article registry 310 or transmit an article identification information and request that the security server 102 determine whether the article identification information is associated with an article 202 that has been reported lost or stolen. The security communication module 312 may then receive the requested information over the Internet 104.

The detector interface module 314 of the detector server 108 generally functions to provide connectivity between the detector server 108 and the coupled detectors 110. The detector interface module 314 contains program logic to receive an article identification information from a coupled detector 110 and determine if the article identification information is associated with a lost or stolen article 202. If the article identification information identifies a lost or stolen article 202, the detector interface module 314 transmits the owner preference information associated with the article 202 to the coupled detector 110. In another embodiment, the detector interface module 314 may additionally transmit the owner preference information to one or more coupled detectors 110 that are proximately located to the detector 110 that detected the lost or stolen article 202.

In one embodiment, the detector interface module 314 utilizes the security communication module 312 to transmit the article identification information to the security server 102 for determining if the article identification information is associated with a lost or stolen article 202. If the article identification information identifies a lost or stolen article 202, the detector interface module 314 receives the owner preference information associated with the article 202 from the security server 102.

In another embodiment, the detector interface module 314 instructs the security communication module 312 to connect to the security server 102 and downloads the information regarding the reported lost or stolen articles 202 from the security server 102. The downloaded information may be stored and maintained in the lost article database 316 on the detector server 108. The detector interface module 314 may periodically, for example, once a day, instruct the security communication module 312 to connect to the security server 102 and update the information in the lost article database 316 regarding the reported lost or stolen articles 202. The detector interface module 314 can then determine if an article identification information received from a coupled detector 110 identifies a lost or stolen article 202 by examining the lost article database 316.

In one embodiment, the detector interface module 314 may instruct the security communication module 312 to download from the security server 102 the contents of the lost article registry 310 and the respective owner preference information. In another embodiment, the detector interface module 314 may instruct the security communication module 312 to download a portion of the contents of the lost article registry 310. For example, the detector server 108 may be located in California. The detector interface module 314 may then request from the security server 102 a list of lost or stolen articles 202 that have been reported in California. The security server 102 may then search the lost article registry 310 for the articles 202 reported lost or stolen in California or neighboring states and transmit the respective article identification information and owner preference information to the detector server 108. In still another embodiment, the detector interface module 314 can determine if a received article identification information identifies a lost or stolen article by first checking the lost article database 316 and, if it is not found in the lost article database 316, then transmitting the article identification information to the security server 102.

The article registry 308, lost article registry 310, and lost article database 316 may be implemented with one or more suitable addressable storage media, such as, by way of example, random access memory (RAM), read-only memory (ROM), disk drives, tape storage, or other suitable volatile or non-volatile data storage facility. The storage media may be on the same or different computers. In one embodiment, the article registry 308, lost article registry 310, or the lost article database 316 may be implemented with Structured Query Language (SQL) code. SQL is a relational database language standard defined by the International Standards Organization (ISO). In another embodiment, the article registry 308, lost article registry 310, or the lost article database 316 may be, by way of example, a relational database, an object oriented database, a hierarchical database, a Lightweight Directory Access Protocol (LDAP) directory, an object oriented-relational database, and the like. In still another embodiment, the article registry 308, lost article registry 310, or the lost article database 316 may conform to any other database standard, or may even conform to a non-standard, private specification. In yet another embodiment, the article registry 308, lost article registry 310, or the lost article database 316 may be implemented using a file system provided with an operating system executing on the computer.

Method for Locating a Lost or Stolen Article

Figure 4:
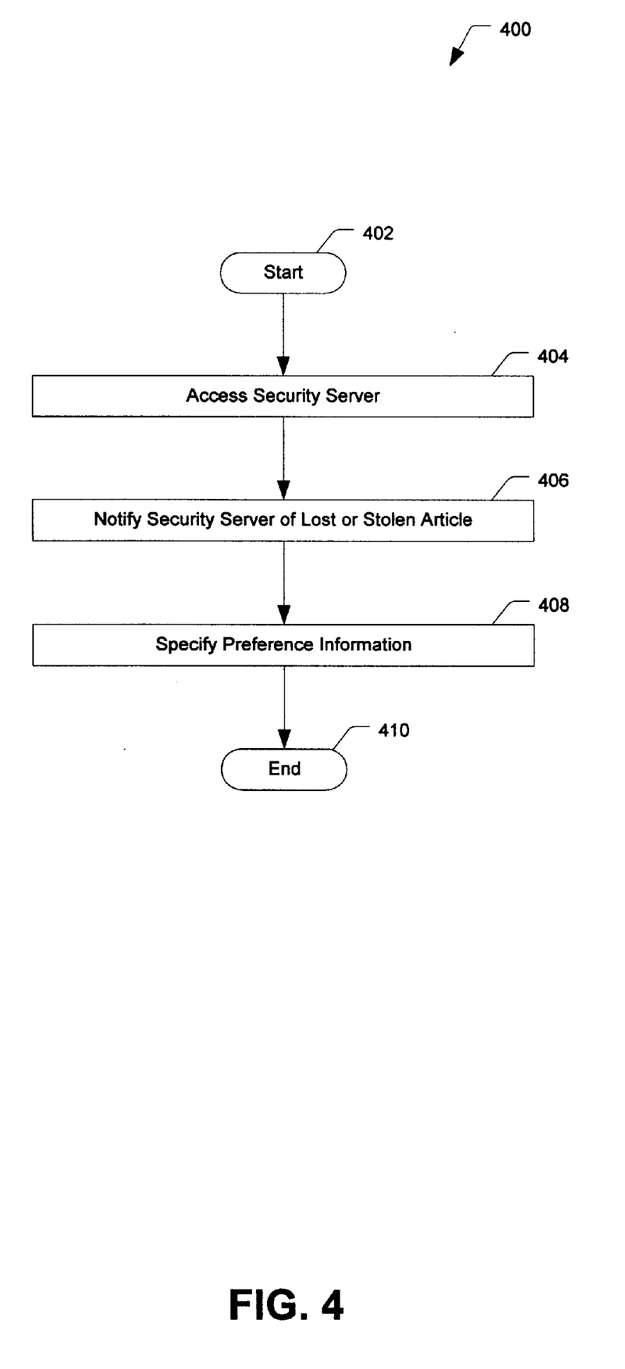
FIG. 4 is a flow chart of an exemplary method for reporting a lost or stolen article, according to an embodiment of the present invention.

FIG. 4 is a flow chart of an exemplary method 400 for reporting a lost or stolen article 202, according to an embodiment of the present invention. Assuming that a registered user had previously registered an article 202 with the security server 102, beginning at a start step 402, the registered user may notice that the registered article 202 has been stolen. In another embodiment, the article 202 may be registered at the point of purchase by the seller of the article 202 as a service to the customer purchasing the article 202. At step 404, the registered user accesses the security server 102 and logs into his or her account by providing the necessary user account information. At step 406, the registered user may select an option to report a registered article 202 as lost or stolen. In particular, the registered user may provide an article identification information to identify the stolen article 202. The registered user may also be prompted to provide additional information such as, by way of example, the time the stolen article 202 was last in the registered user's possession, the last known location of the stolen article 202, and the like.

At step 408, the registered user may be prompted to provide his or her preference as to one or more actions to take if the reported article 202 is located. The security server 102 may provide a list of possible actions (e.g., disable the article 202, trigger an alarm on the article 202, display a message on the article's 202 display, activate a tracking device on the article 202, etc.) that may be initiated on a located article 202. The registered user may then select one or more of the actions based on the components that are on the stolen article 202. For example, if the stolen article 202 is equipped with an alarm component 210 and a disable component 206, the registered user may select the options to trigger the alarm and/or disable the article 202. Selecting any of the other presented actions has no effect on the stolen article 202 because the stolen article 202 is not equipped to initiate the action. The registered user then ends at step 410. In one embodiment, the security server 102 creates one or more records that contain the information and data provided by the registered user and stores the created records in the lost article registry 310.

By way of example, a registered user may notice that a thief stole the user's laptop computer. The laptop computer may have been manufactured "ready" for registration with the security server 102. For example, the laptop computer may have been manufactured with a detector communication module 204, a disable component 206, and an alarm component 210. Assuming that the registered user had previously registered the stolen laptop computer with the security server 102, the registered user can access his or her user account on the security server 102 and report that the laptop computer has been stolen. As part of the reporting process, the registered user may specify his or her preference to have the laptop computer disabled and the alarm triggered if the laptop computer is located.

For articles 202 that are not manufactured ready for registration, the owner may be able to equip the articles 202 with the components that are needed in order to make the articles 202 capable of registration with the security server 102. For example, one or more establishments may provide a service to install a detector communication module 204 on an article 202, thus making the article 202 ready for registration. These establishments may also install one or more of the components 206, 208, 210, and 212 on an article 202, thus providing the article's 202 owner the capability to initiate one or more actions on the article 202.

One of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the invention.

Figure 5:
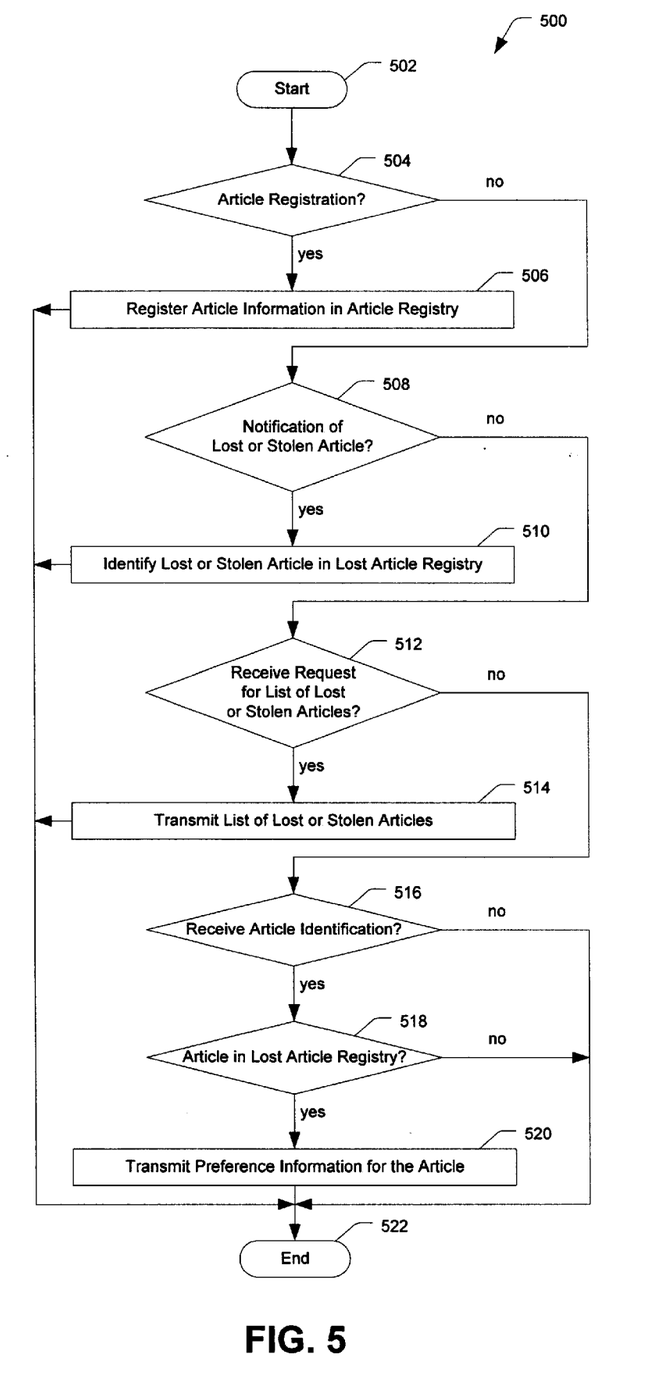
FIG. 5 is a flow chart of an exemplary method for processing requests at a security server, according to an embodiment of the present invention.

FIG. 5 is a flow chart of an exemplary method 500 for processing requests at a security server 102, according to an embodiment of the present invention. Beginning at a start step 502, the security server 102 receives a request to perform an action. The received request may, for example, be a request received from a registered user through the user interface module 302, or a request received from a detector server 108 or a detector 110 through the communication module 304.

At step 504, the security server 102 determines if the received request is a request by a registered user to register an article 202 with the security server 102. If the received request is a request to register an article 202, the user interface component 302 receives the information necessary to register the article 202. At step 506, the user interface component 302 creates one or more records that contain the information and data provided by the registered user and stores the created records in the article registry 308, and ends at step 522.

If, at step 504, the security server 102 determines that the received request is not a request to register an article 202, the security server 102 determines if the received request is a request by a registered user to report a previously registered article 202 as lost or stolen at step 508. If the received request is a request to report a previously registered article 202 lost or stolen, the user interface component 302 receives the information necessary to identify and record the article 202 as lost or stolen. At step 510, the user interface component 302 creates one or more records that contain the information and data provided by the registered user, including any provided owner preference information, and stores the created records in the lost article registry 310, and ends at step 522.

If, at step 508, the security server 102 determines that the received request is not a request to report a lost or stolen article 202, the security server 102 determines if the received request is a request from a detector server 108 to receive a list of lost or stolen articles 202 at step 512. If the received request is a request for the list of lost or stolen articles 202, the security module 306 retrieves the list of lost or stolen articles 202, including each article's 202 respective owner preference information, from, for example, the lost article registry 310. At step 514, the security module 306 utilizes the communication module 304 to transmit the requested list of lost or stolen articles 202 to the requesting detector server 108, and ends at step 522.

If, at step 512, the security server 102 determines that the received request is not a request for a list of lost or stolen articles 202, the security server 102 determines if the received request is an article identification information at step 516. The article identification information may be transmitted by, for example, a detector 110 that detected an article 202, or a detector server 108 that is coupled to a detector that detected an article 202. If the received request is not an article identification information at step 516, the security server 102 ends at step 522. If the received request is an article identification information, the security module 306, at step 518, determines if the article identification information identifies an article 202 that has been reported lost or stolen. In one embodiment, the security module 306 checks to see if the article identification information is found in the lost article registry 310.

If, at step 518, the article identification information is not associated with a lost or stolen article 202 (e.g., the article identification information is not found in the lost article registry 310), the security module 306 ends at step 522. If, at step 518, the article identification information identifies a lost or stolen article 202, the security module 306 retrieves the owner preference information associated with the lost or stolen article 202. At step 520, the security module 306 utilizes the communication module 304 to transmit the owner preference information for the lost or stolen article 202 to the requesting detector 110 or the detector server 108, and ends at step 522.

In one embodiment, the security module 306 may notify one or more law enforcement agencies in the proximity of the located lost or stolen article 202. For example, the security module 306 may connect to one or more law enforcement agency computers and transmit information regarding the located lost or stolen article 202. The security module 306 may transmit information, such as, the article identification information identifying the lost or stolen article 202 and the location of the lost or stolen article 202, for example, as determined from the location of the detector 110 that detected the lost or stolen article 202. The law enforcement agency may then proceed to recover the lost or stolen article 202. Having recovered the lost or stolen article 202, the law enforcement agency can contact its rightful owner to arrange the return of the article 202 to its owner. The law enforcement agency can also notify the security server 102 or an administrator of the security server 102 that the lost or stolen article 202 has been recovered.

Figure 6:
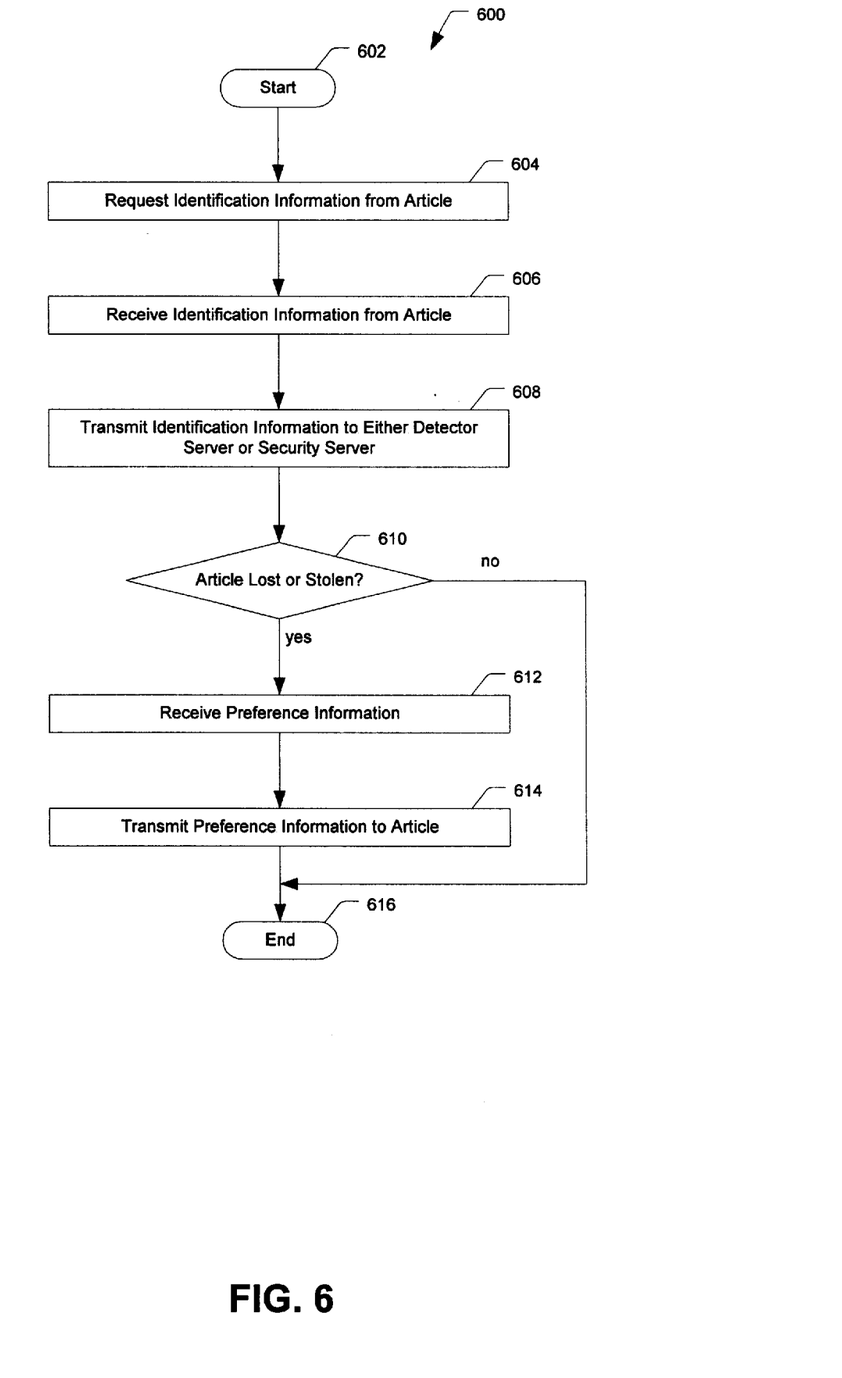
FIG. 6 is a flow chart of an exemplary method for locating an article, according to an embodiment of the present invention.

FIG. 6 is a flow chart of an exemplary method 600 for locating an article 202, according to an embodiment of the present invention. Beginning at a start step 602, a detector 110 detects, for example, that an article 202 is within its transmitting range. At step 604, the sensor module 214 on the detector 110 transmits a request for the detected article's 202 article identification information. At step 606, the sensor module 214 receives the article identification information from the detected article 202.

Continuing the previous laptop example, the thief in possession of the stolen laptop computer may have taken the laptop computer to a shopping mall. A detector 110 located in the shopping mall may have detected the laptop computer and transmitted a request for the laptop computer's article identification information. The laptop computer, being within the detector's 110 transmitting range, receives the request and transmits its article identification information, which is received by the detector 110.

At step 608, the communication module 216 on the detector 110 transmits the received article identification information to either a coupled detector server 108 or the security server 102 for determination as to whether the article identification information identifies a reported lost or stolen article 202. For example, if the detector 110 is coupled to a detector server 108, the detector 110 transmits the article identification information to the detector server 108. Otherwise, the detector 110 transmits, for example, over the telecommunication network 114 the article identification information to the security server 102.

Continuing the laptop example, the detectors 110 positioned throughout the shopping mall, including the detector 110 that detected the laptop computer, may be coupled to a detector server 108. The detector server 108 services the detectors 110 in the shopping mall. Furthermore, the detector server 108 may have previously downloaded a list of lost or stolen articles 202, including the respective owner preference information, from the security server 102. The detector 110 that detected the laptop computer, having received the article identification information from the laptop computer, transmits the article identification information to the detector server 108.

At step 610, the communication module 216 on the detector 110 waits to receive an indication as to whether the article identification information is associated with a lost or stolen article 202. If the article identification information is not associated with a lost or stolen article 202 (e.g., the communication module 216 on the detector 110 does not receive a response to the transmitted article identification information), the communication module 216 ends at step 616. If the article identification is associated with a lost or stolen article 202, the communication module 216 receives the owner preference information for the lost or stolen article 202 identified by the transmitted article identification information at step 612. At step 614, the communication module 216 utilizes the sensor module 214 to transmit the received owner preference information and ends at step 616. The detected article 202 receives the transmitted owner preference information if the article 202 is still within transmitting range of the transmitting detector 110.

Continuing the previous laptop example, the detector server 108 that is coupled to the detectors 110 located in the shopping mall checks its lost article database 316 and determines that the article identification information is associated with the laptop computer that was reported stolen. The detector server 108 retrieves and transmits to the detecting detector 110 the owner preference information which indicates that the laptop owner wanted the laptop computer disabled and the alarm on the laptop computer triggered. The detector 110 receives and transmits the owner preference information. In another embodiment, the detector server 108 may transmit the owner preference information to all the detectors 110 in the shopping mall, thus increasing the likelihood that the laptop computer will receive the owner preference information.

Figure 7:
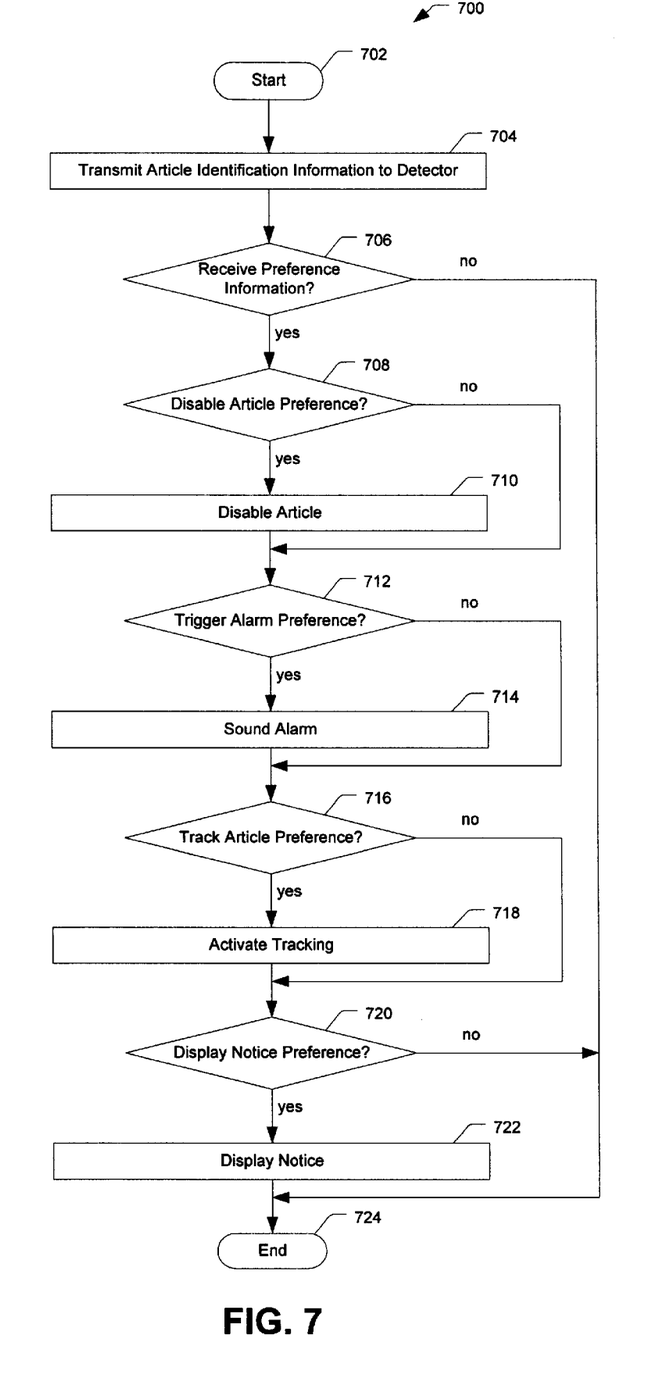
FIG. 7 is a flow chart of an exemplary method for processing preference information on an article, according to an embodiment of the present invention.

FIG. 7 is a flow chart of an exemplary method 700 for processing preference information on an article 202, according to an embodiment of the present invention. Beginning at a start step 702, an article 202 equipped with a detector communication module 204 is detected by a detector 110. In particular, the detector communication module 204 on the article 202 receives a request to transmit the article identification information. At step 704, the detector communication module 204 retrieves and transmits the article identification information for reception by the requesting detector 110. In another embodiment, another detector 110 different from the requesting detector 110 may receive the transmitted article identification information. This may occur if the article 202 moved out of the requesting detector's 110 transmitting range and into the transmitting range of the other detector 110.

Continuing the previous laptop example, the detector communication module 204 on the laptop computer may receive a request to transmit the laptop computer's article identification information. This request may have been transmitted by the sensor module 214 on the detector 110 located in the shopping mall. The detector communication module 204 can then retrieve and transmit the laptop computer's article identification information for reception by the detector 110 in the shopping mall. If the thief is moving inside the shopping mall, the article identification information may be received by another detector 110 located inside the shopping mall that is within transmitting range of the laptop computer.

At step 706, the detector communication module 204 determines if owner preference information associated with the article 202 is received. If the owner preference information is not received, the article 202 is not lost or stolen and the detector communication module 204 ends at step 724. If, at step 706, the detector communication module 204 receives the owner preference information associated with the article 202 (e.g., the article 202 is lost or stolen), the detector communication module 204, at step 708, determines if the owner preference information includes a request to disable the article 202. If, at step 708, the owner preference information includes a request to disable the article 202, the detector communication module 204 issues a request to the disable component 206 to disable the article 202. At step 710, the disable component 206 disables the article 202.

If the owner preference information does not include a request to disable the article 202, or after issuing the request to the disable component 206 to disable the article 202, the detector communication module 204, at step 712, determines if the owner preference information includes a request to trigger an alarm on the article 202. If, at step 712, the owner preference information includes a request to trigger an alarm on the article 202, the detector communication module 204 issues a request to the alarm component 210 to sound an alarm on the article 202. At step 714, the alarm component 210 triggers the alarm on the article 202.

If the owner preference information does not include a request to trigger an alarm on the article 202, or after issuing the request to the alarm component 210 to sound an alarm on the article 202, the detector communication module 204, at step 716, determines if the owner preference information includes a request to activate a tracking device on the article 202. If, at step 716, the owner preference information includes a request to activate a tracking device on the article 202, the detector communication module 204 issues a request to the tracking component 208 to activate the tracking of the article 202. At step 718, the tracking component 208 emits a tracking signal to enable the tracking of the article 202.

If the owner preference information does not include a request to activate a tracking device on the article 202, or after issuing the request to the tracking component 208 to activate the tracking of the article 202, the detector communication module 204, at step 720, determines if the owner preference information includes a request to display a notice on the article 202. If, at step 720, the owner preference information includes a request to display a notice on the article 202, the detector communication module 204 issues a request to the display component 212 to display a notice on the article's 202 display device. At step 722, the display component 212 displays, for example, a notice that the article has been lost or stolen on the article's 202 display device, and ends at step 724. If the owner preference information does not include a request to display a notice on the article 202, the detector communication module 204 ends at step 724.

Continuing the previous laptop example, the detector communication module 204 on the laptop computer receives the owner preference information specified by the owner of the laptop computer. The received owner preference information included the laptop computer owner's preference to have the laptop computer disabled and to have the alarm triggered on the laptop computer. The detector communication module 204 initiates the actions requested by the owner on the laptop computer. For example, the detector communication module 204 initiates a request to disable the laptop computer to the disable component 206, and initiates a request to sound the alarm to the alarm component 210. Subsequently, the laptop computer is disabled, making the laptop computer inoperable by the thief, and the alarm is sounded, thus alerting the people near the laptop computer that the laptop computer has been stolen.

As described herein, the present invention in at least one embodiment allows for the increased likelihood that a lost or stolen article (e.g., automobile, laptop computer, PDA, cell phone, camcorder, etc.) will be recovered. In one embodiment, the article is equipped with a short-range wireless communication device, such as a Bluetooth short-range radio transceiver, and a unique article identification. The owner of the article registers the article with a security server that offers security services. Subsequently, if the article is lost or stolen, the owner accesses the security server and reports the article as missing. Public establishments, such as airports, shopping malls, merchant stores, bus stations, train stations, gas stations, toll booths, and the like, are equipped with detectors that are coupled to the security server. These detectors detect and connect to articles that are equipped with the short-range communication device and which come within range of the detectors. The detectors obtain the detected article's identification information and transmit the identification information to the security server for determining if the article has been reported lost or stolen. Thus, the present invention provides a system and method for locating lost or stolen articles, increasing the chance that the articles can be recovered.

In at least one embodiment, the present invention enables an owner of a missing article that has been reported with a security server as lost or stolen to specify his or her preference as to what actions to initiate on the article if the article is located. Depending on the article's capabilities, the owner can specify his or her preference to disable the article, trigger an alarm on the article, trigger a tracking device on the article, or display a message on the article. Subsequently, when a detector detects the stolen article, the detector transmits the specified owner preference information, which causes the specified actions to be triggered. Thus, in addition to increasing the chances of locating and recovering lost or stolen articles, the present invention also increases the chance that the lost or stolen article will be rendered useless if stolen. Furthermore, the article owner is given control over the recovery process. This has the potential of significantly discouraging the theft of the articles.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method for reporting article identification information comprising:
   providing, on an article, communication capability to a detector;
   responsive to receiving a request to transmit an article identification information from the detector, transmitting the article identification information to the detector;
   receiving owner preference information from the detector; and
   responsive to receiving owner preference information, initiating an action on the article.

2. The method of claim 1, wherein the communication capability comprises Bluetooth technology.

3. The method of claim 1, wherein the action is determined from the owner preference information, the action comprising disabling the article.

4. The method of claim 1, wherein the action is determined from the owner preference information, the action comprising triggering an alarm on the article.

5. The method of claim 1, wherein the action is determined from the owner preference information, the action comprising activating a tracking device on the article.

6. The method of claim 1, wherein the action is determined from the owner preference information, the action comprising displaying a message on the article.

7. A method for providing an article security service comprising:
   providing an article registry comprising a plurality of registered article identification information and associated owner preference information;
   providing a lost article registry comprising a plurality of lost article identification information;
   receiving a first article identification information; and
   responsive to finding the first article identification information in the lost article registry, transmitting the associated owner preference information.

8. The method of claim 7, wherein the associated owner preference information is transmitted to a first detector, the first detector having transmitted the first article identification.

9. The method of claim 8 further comprising transmitting the associated owner preference information to a second detector, the second detector being located proximate to the first detector.

10. The method of claim 7 further comprising transmitting an article location message to a police station computer in response to finding the first article identification information in the lost article registry.

11. The method of claim 7 further comprising receiving a notification of a lost or stolen article.

12. A security server comprising:
   an article registry comprising a plurality of registered article identification information and associated owner preference information;
   a lost article registry comprising a plurality of lost article identification information; and
   a module coupled to the article registry and the lost article registry and operable to receive an article identification information, the module also operable to determine if the received article information is in the lost article registry, and, the module further operable to retrieve and transmit the owner preference information associated with the received article information in response to finding the received article identification information in the lost article registry.

13. The security server of claim 12, wherein the article identification information is received from a first detector and the owner preference information is transmitted to the first detector.

14. The security server of claim 12, wherein the article identification information is received from a first detector and the owner preference information is transmitted to a second detector, wherein the second detector is located proximate to the first detector.

15. The security server of claim 12, wherein the module is further operable to transmit an article location message to a police station computer.

16. A security apparatus coupled to an article, the security apparatus comprising:
- an article identification information operable to uniquely identify an article; and
- a detector communication module coupled to the article identification information and operable to receive a request to transmit the article identification information, the detector communication module also operable to receive owner preference information, the detector communication module further operable to trigger an action on the article based on the received owner preference information.

17. The apparatus of claim 16, wherein the detector communication module conforms to Bluetooth technology.

18. The apparatus of claim 16, wherein the detector communication module conforms to a wireless technology.

19. The apparatus of claim 16 further comprising a disable component operable to disable the article.

20. The apparatus of claim 16 further comprising a tracking component operable to transmit a tracking signal.

\* \* \* \* \*